United States Patent
Tang

(10) Patent No.: US 11,128,513 B2
(45) Date of Patent: Sep. 21, 2021

(54) DATA TRANSMISSION METHOD, NETWORK EQUIPMENT, AND TERMINAL EQUIPMENT

(71) Applicant: Guangdong OPPO Mobile Telecommunications Corp., Ltd., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/310,417

(22) PCT Filed: Jul. 28, 2016

(86) PCT No.: PCT/CN2016/092101
§ 371 (c)(1),
(2) Date: Dec. 14, 2018

(87) PCT Pub. No.: WO2018/018509
PCT Pub. Date: Feb. 1, 2018

(65) Prior Publication Data
US 2019/0334753 A1    Oct. 31, 2019

(51) Int. Cl.
*H04L 27/26* (2006.01)
*H04L 5/00* (2006.01)
*H04W 72/04* (2009.01)

(52) U.S. Cl.
CPC ........ *H04L 27/2666* (2013.01); *H04L 5/0044* (2013.01); *H04L 5/0092* (2013.01); *H04L 5/0094* (2013.01); *H04W 72/0453* (2013.01)

(58) Field of Classification Search
CPC . H04L 27/2666; H04L 5/0092; H04L 5/0044; H04L 5/0094; H04W 72/0453
See application file for complete search history.

(56) References Cited

U.S. PATENT DOCUMENTS 9,001,908 B2 * 4/2015 Zhang .................. H04L 5/0023
375/260
9,860,099 B1 * 1/2018 Noh ..................... H04L 27/2602
(Continued)

FOREIGN PATENT DOCUMENTS

CN    101473619 A    7/2009
CN    101895335 A    11/2010
(Continued)

OTHER PUBLICATIONS

Huawei et al: "Link level evaluation results of waveform proposals", 3GPP Draft; R1-165426, 3rd Generation Partnership Project (3GPP), Mobile Competence Centre; May 22, 2016 (May 22, 2016), XP051111635, Retrieved from the Internet: URL:https://www.3gpp.org/ftp/tsg_ran/WG1_RL1/TSGR1_85/Docs/ [retrieved on May 22, 2016].

(Continued)

*Primary Examiner* — Jamal Javaid
(74) *Attorney, Agent, or Firm* — Young Basile Hanlon & MacFarlane, P.C.

(57) ABSTRACT

A method, network device and terminal device for transmitting data are provided. The method includes: a network device determines a numerology for transmitting data, and determines a target frequency band for transmitting the data, the target frequency band including a transmission frequency band for transmitting the data and a guard tone; the network device sends configuration information to the terminal device, the configuration information including the numerology and information of the target frequency band; the network device receives the data sent by the terminal device or sends the data to the terminal device on the transmission frequency band according to the numerology.

7 Claims, 10 Drawing Sheets

(56) References Cited

U.S. PATENT DOCUMENTS

| | | | | |
|---|---|---|---|---|
| 2009/0232071 A1* | 9/2009 | Cho | ................ | H04L 5/0044 370/329 |
| 2011/0218007 A1 | 9/2011 | Kimura | | |
| 2011/0317647 A1 | 12/2011 | Cho et al. | | |
| 2013/0208680 A1* | 8/2013 | Kang | ................ | H04W 28/20 370/329 |
| 2016/0073387 A1 | 3/2016 | Yang et al. | | |
| 2017/0163395 A1* | 6/2017 | Kwak | ................ | H04L 5/0048 |

FOREIGN PATENT DOCUMENTS

| | | | |
|---|---|---|---|
| CN | 102238692 | A | 11/2011 |
| CN | 103220796 | A | 7/2013 |
| CN | 105794254 | A | 7/2016 |
| EP | 2991238 | A1 | 3/2016 |
| JP | 2019517178 | A | 6/2019 |
| WO | 2016032216 | A1 | 3/2016 |
| WO | 2017195048 | A1 | 11/2017 |

OTHER PUBLICATIONS

Extended European search report issued in corresponding European application No. 16910090.6 dated Jun. 13, 2019.
English Translation of First Chinese Office Action dated Mar. 24, 2020 for Application No. 201680087135.3.
English Translation of Second Chinese Office Action dated Jun. 4, 2020 for Application No. 201680087135.3.
3GPP TSG-RAN WG1 #85; May 23-27, 2016; Nanjing, China; R1-164692.
3GPP TSG RAN WG1 Meeting #85; Nanjing, May 23-27, 2016; R1-165833.
Office Action in corresponding in Application 201817049461 dated Jun. 14, 2020.
English translation of the third CN Office Action for CN Application 201680087135.3 dated Aug. 26, 2020.
English translation of Japan Notice of Reason for Refusal for JP Application 2018-567924 dated Jul. 16, 2020.
Communication pursuant to Article 94(3) EPC for EP Application 16910090.6 dated Jul. 30, 2021. (6 pages).
Taiwan Office Action with English Translation for TW Application 106122115 dated Jun. 16, 2021. (13 pages).

\* cited by examiner

DATA TRANSMISSION METHOD, NETWORK EQUIPMENT, AND TERMINAL EQUIPMENT

CROSS-REFERENCE TO RELATED APPLICATION(S)

This application is a 371 application of International Application No. PCT/CN2016/092101, filed on Jul. 28, 2016, the entire disclosure of which is hereby incorporated by reference.

TECHNICAL FIELD

The present disclosure relates to the communication field, and more particularly, to a method, a network device and a terminal device for transmitting data.

BACKGROUND

In the fifth generation (5G) mobile communication technology, user equipment (UE) can support a variety of different numerologies in one carrier. These different numerologies can be multiplexed by frequency division multiplexing (FDM). In a same transmission time interval (TTI), different frequency domain resources can be allocated for data transmissions based on different numerologies. For example, in a long term evolution (LTE) system, the subcarrier bandwidth is 15 kHz and the symbol width is $1/14$ ms. A major difference between the 5G communication system and 4G communication system is that the 5G communication system can support data transmissions based on different numerologies, and the 5G terminal can also support data transmissions based on different numerologies. For example, the subcarrier bandwidth of the 5G communication system can be $15*2^n$ Hz (n is a non-negative integer).

Data transmissions based on different numerologies can be achieved in different frequency bands, but it will reduce the flexibility of the 5G communication system. The maximum flexibility is brought to the 5G communication system by multiplexing different numerologies, but when different numerologies are multiplexed, there may be mutual interference between data transmission processes based on different numerologies.

SUMMARY

Implementations of the disclosure provide a method, a terminal device and a network device for transmitting data.

In a first aspect, a method for transmitting data is provided. The method includes: a network device determines a numerology for transmitting data, and determines a target frequency band for transmitting the data, wherein the target frequency band includes a transmission frequency band for transmitting the data and a guard tone; the network device sends configuration information to the terminal device, wherein the configuration information includes the numerology and information of the target frequency band; the network device receives the data sent by the terminal device on the transmission frequency band according to the numerology or the network device sends the data to the terminal device on the transmission frequency band according to the numerology.

Herein a high-frequency end and a low-frequency end of the guard tone are respectively adjacent to the transmission frequency bands used for data transmissions based on different numerologies, and the terminal device will not transmit and receive the data on the guard tone.

In another implementation, the information of the target frequency band includes a start position and an end position of the target frequency band, a bandwidth of the guard tone, and a position of the guard tone in the target frequency band.

In another implementation, the information of the target frequency band includes a start position and an end position of the target frequency band, and a start position and an end position of the guard tone.

In another implementation, the position of the guard tone in the target frequency band includes a low-frequency end and/or a high-frequency end of the target frequency band where the guard tone is located.

In another implementation, the bandwidth of the guard tone is an integer multiple of minimum subcarrier spacing supported by the network device.

In another implementation, the configuration information further includes a filtering mode corresponding to the numerology. Before the network device sends the configuration information to the terminal device, the method further includes the network device determines the filtering mode corresponding to the numerology.

In another implementation, the filtering mode includes at least one of: a type of a baseband filter, parameters of the baseband filter, a filtering waveform adopted, and parameters of the filtering waveform.

In another implementation, the numerology includes subcarrier spacing.

In another implementation, that the network device determines a numerology for transmitting the data includes: the network device determines the numerology for transmitting the data from a plurality of predefined numerologies.

In a second aspect, a network device is provided. The network device may be used to perform the aforementioned first aspect and various processes that should be performed by a network device in methods for transmitting data in various implementations. The network device includes a determination module and a transmission module. The determination module is configured to determine a numerology for transmitting data and determine a target frequency band for transmitting the data, wherein the target frequency band includes a transmission frequency band for transmitting the data and a guard tone. The transmission module is configured to send configuration information determined by the determination module to a terminal device, wherein the configuration information includes the numerology and information of the target frequency band. The transmission module is further configured to receive the data sent by the terminal device on the transmission frequency band determined by the determination module according to the numerology determined by the determination module or send the data to the terminal device on the transmission frequency band determined by the determination module according to the numerology determined by the determination module.

In a third aspect, a network device is provided. The network device may be used to perform the aforementioned first aspect and various processes in methods for transmitting data that should be performed by performed by a network device in various implementations. The network device includes a processor and a transceiver. The processor is configured to determine a numerology for transmitting data and determining a target frequency band for transmitting the data, wherein the target frequency band includes a transmission frequency band for transmitting the data and a guard tone. The transceiver is configured to send configuration information determined by the processor to a terminal device, wherein the configuration information includes the numerology and information of the target frequency band. The transceiver is further configured to receive the data sent by the terminal device on the transmission frequency band determined by the processor according to the numerology determined by the determination module or send the data to the terminal device on the transmission frequency band determined by the processor according to the numerology determined by the processor.

In a fourth aspect, a method for transmitting data is provided. The method includes: a terminal device receives configuration information sent by a network device, wherein the configuration information includes a numerology and information of a target frequency hand for transmitting the data, wherein the target frequency band includes a transmission frequency band for transmitting the data and a guard tone; the terminal device sends the data to the network device on the transmission frequency band according to the numerology or receives the data sent by the network device on the transmission frequency band according to the numerology.

Herein, a high-frequency end and a low-frequency end of the guard tone are respectively adjacent to the transmission frequency bands used for data transmissions based on different numerologies, and the terminal device will not transmit and receive the data on the guard tone.

In another implementation, the information of the target frequency band includes a start position and an end position of the target frequency band, a bandwidth of the guard tone, and a position of the guard tone in the target frequency band.

In another implementation, the information of the target frequency band includes a start position and an end position of the target frequency band, and a start position and an end position of the guard tone.

In another implementation, the position of the guard tone in the target frequency band includes a low-frequency end and/or a high-frequency end of the target frequency band where the guard tone is located.

In another implementation, the bandwidth of the guard tone is an integer multiple of minimum subcarrier spacing supported by the network device.

In another implementation, the configuration information further includes a filtering mode corresponding to the numerology. That the terminal device sends the data to the network device on the transmission frequency band according to the numerology or receives the data sent by the network device on the transmission frequency band according to the numerology, includes: the terminal device processes the data according to the filtering mode and sends the processed data to the network device on the target frequency band according to the numerology, or, the terminal device receives the data sent by the network device according to the numerology and processes the received data according to the filtering mode.

In another implementation, the filtering mode includes at least one of: a type of a baseband filter, parameters of the baseband filter, a filtering waveform adopted, and parameters of the filtering waveform.

In another implementation, the numerology includes subcarrier spacing.

In a fifth aspect, a terminal device is provided. The terminal device can be used to perform the aforementioned fourth aspect and various processes in methods for transmitting data that should be performed by a terminal device in various implementations. The terminal device includes a transmission module. The transmission module is configured to receive configuration information sent by a network device, wherein the configuration information includes a numerology and information of a target frequency band for transmitting data, wherein the target frequency band includes a transmission frequency band for transmitting the data and a guard tone; and send the data to the network device on the transmission frequency band according to the numerology or receive the data sent by the network device on the transmission frequency band according to the numerology.

In a sixth aspect, a terminal device is provided. The terminal device can be used to perform the aforementioned fourth aspect and various processes in methods for transmitting data that should be performed by a terminal device in various implementations. The terminal device includes a transceiver. The transceiver is configured to receive configuration information sent by a network device, wherein the configuration information includes a numerology and information of a target frequency band for transmitting data, wherein the target frequency band includes a transmission frequency band for transmitting the data and a guard tone; send the data to the network device on the transmission frequency band according to the numerology, or receive the data sent by the network device on the transmission frequency band according to the numerology.

In a seventh aspect, a method for transmitting data is provided. The method includes: a network device determines a numerology for transmitting data, a transmission frequency band for transmitting the data, and a filtering mode corresponding to the numerology; the network device sends configuration information to a terminal device, wherein the configuration information includes the numerology, the transmission frequency band and the filtering mode; the network device receives the data sent by the terminal device on the transmission frequency band according to the numerology or sends the data to the terminal device on the transmission frequency band according to the numerology.

In another implementation, the filtering mode includes at least one of: a type of a baseband filter, parameters of the baseband filter, a filtering waveform adopted, and parameters of the filtering waveform.

In another implementation, the numerology includes subcarrier spacing.

In another implementation, that the network device determines a numerology for transmitting data includes: the network device determines the numerology for transmitting the data from a plurality of predefined numerologies.

In an eighth aspect, a network device is provided. The network device can be used to perform the aforementioned seventh aspect and various processes in methods for transmitting data that should be performed by a network device in various implementations. The network device includes a determination module and a transmission module. The determination module is configured to determine a numerology for transmitting data, a transmission frequency band for transmitting the data and a filtering mode corresponding to the numerology. The transmission module is configured to send configuration information to a terminal device, wherein the configuration information includes the numerology, the transmission frequency band and the filtering mode. The transmission module is further configured to receive the data sent by the terminal device on the transmission frequency band according to the numerology or send the data to the terminal device on the transmission frequency band according to the numerology.

In a ninth aspect, a network device is provided. The network device may be used to perform the aforementioned seventh aspect and various processes in methods for transmitting data that should be performed by a network device in various implementations. The network device includes a processor and a transceiver. The processor is configured to determine a numerology for transmitting data, a transmission frequency band for transmitting the data and a filtering mode corresponding to the numerology. The transceiver is configured to send configuration information to the terminal device, wherein the configuration information includes the numerology, the transmission frequency band and the filtering mode. The transceiver is further configured to receive the data sent by the terminal device on the transmission frequency band according to the numerology or send the data to the terminal device on the transmission frequency band according to the numerology.

In a tenth aspect, a method for transmitting data is provided. The method includes: a terminal device receives configuration information sent by a network device, wherein the configuration information includes a numerology for transmitting data, a transmission frequency band for transmitting the data, and a filtering mode corresponding to the numerology. The terminal device processes the data according to the filtering mode and sends the processed data to the network device on the transmission frequency band according to the numerology; or, the terminal device receives the data sent by the network device according to the numerology and processes the received data according to the filtering mode.

In another implementation, the filtering mode includes at least one of: a type of a baseband filter, parameters of the baseband filter, a filtering waveform adopted, and parameters of the filtering waveform.

In another implementation, the numerology includes subcarrier spacing.

In an eleventh aspect, a terminal device is provided. The terminal device can be used to perform the aforementioned tenth aspect and various processes in methods for transmitting data that should be performed by a terminal device in various implementations. The terminal device includes a transmission module configured to receive configuration information sent by a network device, wherein the configuration information includes a numerology for transmitting data, a transmission frequency band for transmitting the data and a filtering mode corresponding to the numerology, process the data according to the filtering mode; and send the processed data to the network device on the transmission frequency band according to the numerology; or, receive the data sent by the network device according to the numerology and process the received data according to the filtering mode.

In a twelfth aspect, a terminal device is provided. The terminal device may be used to perform the aforementioned tenth aspect and various processes performed in methods for transmitting data that should be performed by a terminal device in various implementations. The terminal device includes a transceiver configured to receive configuration information sent by a network device, wherein the configuration information includes a numerology for transmitting data, a transmission frequency band for transmitting the data and a filtering mode corresponding to the numerology; process the data according to the filtering mode, and send the processed data to the network device on the transmission frequency band according to the numerology; or, receive the data sent by the network device according to the numerology and process the received data according to the filtering mode.

In a thirteenth aspect, there is provided a computer-readable storage medium storing a program that causes a network device to perform the method for transmitting data in any of the above-described first aspect and various implementations thereof.

In a fourteenth aspect, there is provided a computer-readable storage medium storing a program that causes a terminal device to perform the method for transmitting data in any of the above-described fourth aspect and various implementations thereof.

In a fifteenth aspect, there is provided a computer-readable storage medium storing a program that causes a network device to perform the method for transmitting data in any of the above-described seventh aspect and various implementations thereof.

In a sixteenth aspect, there is provided a computer-readable storage medium storing a program that causes a terminal device to perform the method for transmitting data in any of the above-described tenth aspect and various implementations thereof.

BRIEF DESCRIPTION OF THE DRAWINGS

In order to explain the technical solutions of the implementations of the present disclosure more clearly, the drawings referred to in the implementations of the present invention will be briefly described below. Obviously, the drawings in the following description are only some implementations of the present disclosure. For those of ordinary skill in the art, other drawings can be obtained without paying an inventive effort.

DETAILED DESCRIPTION

The technical solutions in the implementations of the present disclosure will be described clearly and completely in the following with reference to the drawings in the implementations of the present disclosure. Obviously, the described implementations are parts, but not all, of the implementations of the present disclosure. Based on the implementations of the present disclosure, all other implementations obtained by a person of ordinary skill in the art without paying an inventive effort should fall within the scope of the present disclosure.

It should be understood that the technical solutions of the implementations of the present disclosure may be applied to various communication systems, such as the Global System of Mobile Communication (GSM) system, Code Division Multiple Access (CDMA) system, Wideband Code Division Multiple Access (WCDMA) system, General Packet Radio Service (CPRS), Long Term Evolution (LTE) system, and universal mobile telecommunications system (UMTS) system, and it may be particularly applied to the 5G communication system in the future.

A terminal device in the implementations of the present disclosure may also be referred to as a user equipment WE), access terminal, subscriber unit, subscriber station, mobile station, mobile station, remote station, remote terminal, mobile equipment, user terminal, terminal, wireless communication equipment, user agent, or user apparatus. The access terminal may be a cellular phone, a cordless phone, a session initiation protocol (SIP) phone, a wireless local loop (WLL) station, a personal digital assistant (PDA), a handheld device with a wireless communication function, a computing device or other processing device connected to a wireless modem, an on-board device, a wearable device, a terminal device in a future 5G network, or a terminal device in a future evolving public land mobile network (PLMN), etc.

A network device in the implementations of the present disclosure may be a device for communicating with a terminal device, and may be a base transceiver station (BTS) in a GSM system or CDMA system, a NodeB (NB) in a WCDMA system, an evolutional NodeB in an LTE system (eNB or eNodeB), or a wireless controller in a scenario of a cloud radio access network (CRAM), or the network device may be a relay station, an access point, an on-board device, or a wearable device, a network device in a fixture 5G network or a network device in a future evolved public land mobile network (PLMN), etc.

Figure 1:
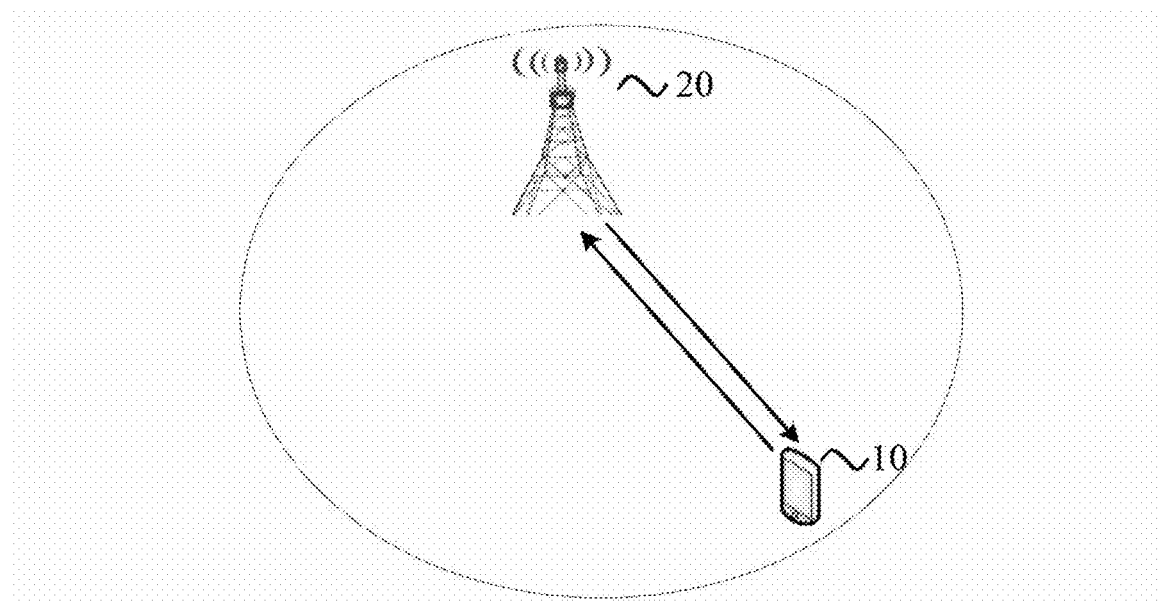
FIG. 1 is a schematic diagram of an application scenario of the present disclosure.

FIG. 1 is a schematic diagram of an application scenario of the present disclosure. The communication system in FIG. 1 may include a network device 10 and a terminal device 20. The network device 10 is configured to provide communication services for the terminal device 20, and the network device 10 is connected to a core network. The terminal device 20 accesses the network by searching for a synchronization signal, or broadcast signal, etc. transmitted by the network device 10 to communicate with the network. Arrows shown in FIG. 1 may represent uplink/downlink transmission through cellular links between the terminal device 20 and the network device 10. By using different DCI formats to schedule data transmissions based on different numerologies, implementations of the disclosure can improve the flexibility of control signaling design.

Figure 2:
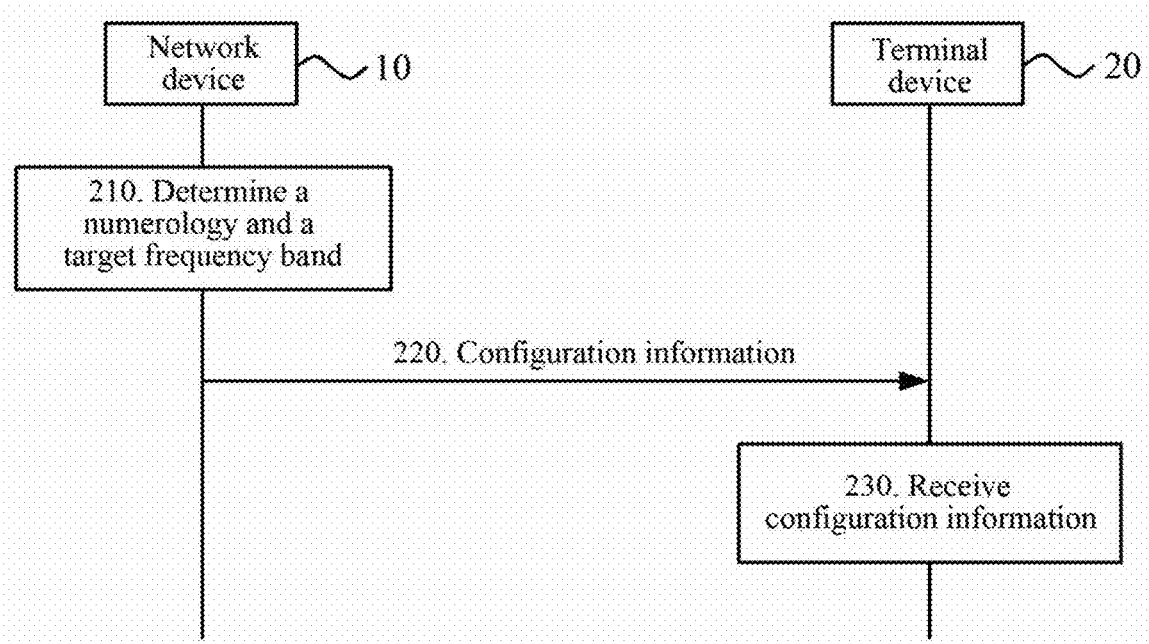
FIG. 2 is a schematic diagram of an interaction flow in a method for transmitting data according to an implementation of the present disclosure.

FIG. 2 shows a schematic diagram of an interaction flow in a method for transmitting data according to an implementation of the present disclosure. A network device 10 and terminal device 20 are shown in FIG. 2. As shown in FIG. 2, a specific flow for transmitting data includes acts 210-230.

In 210, the network device 10 determines a numerology and a target frequency band for transmitting the data.

Herein, the target frequency band includes a transmission frequency band for transmitting the data and a guard tone, and the terminal device 20 does not transmit the data in the guard tone. A high-frequency end and a low-frequency end of the guard tone are respectively adjacent to the transmission frequency bands used for data transmissions based on different numerologies, and the terminal device will not send and receive 5G signals in this area.

Specifically, in order to prevent mutual interference between data transmission processes in which different numerologies are used, when signals transmitted based on different numerologies are adjacent in frequency domain, that is, when multiplying is performed in an FDM mode, a guard tone/guard subcarrier may be inserted between two originally adjacent frequency bands, and the terminal device does not transmit data in the guard tone, so that the guard tone can be used to isolate frequency bands used for data transmissions based on different numerologies.

Figure 3:
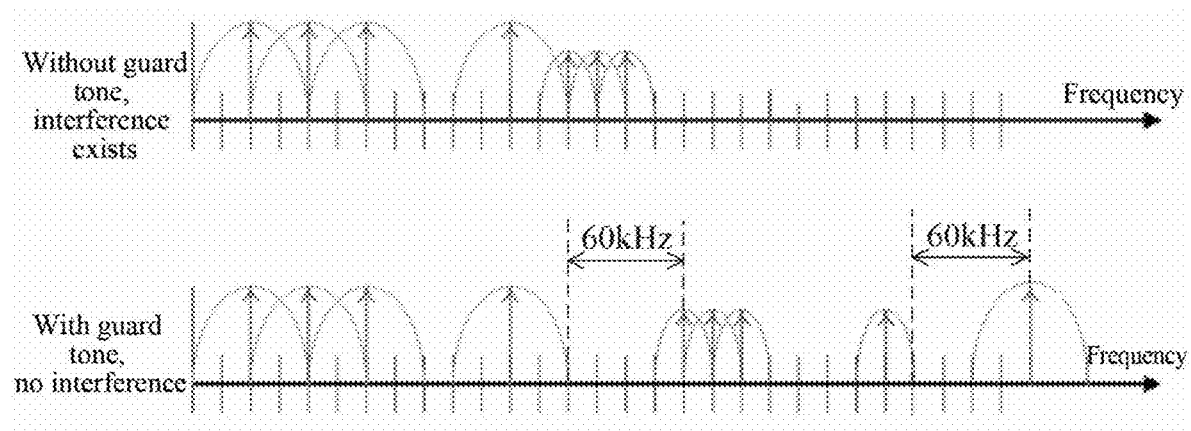
FIG. 3 is a schematic diagram of data transmissions based on different numerologies in absence of a guard tone and in presence of a guard tone.

For example, FIG. 3 shows a schematic diagram of data transmissions based on different numerologies in absence of a guard tone and in presence of a guard tone. Taking FIG. 3 as an example, when there is no guard tone, mutual interference can easily occur when data is transmitted on adjacent frequency bands by using different numerologies. For example, as shown in FIG. 3, when subcarrier spacing used for data transmissions in two adjacent frequency bands is 30 kHz and 15 kHz respectively, in the process of transmitting data by using the subcarrier spacing respectively in the two adjacent bands, interference occurs when data is transmitted in the two adjacent frequency bands using different subcarrier spacing. However, when there is a guard tone, for example, as shown in FIG. 3, the subcarrier spacing used for data transmissions on two different frequency bands is 30 Hz and 15 kHz respectively. During data transmissions on these two frequency bands using the subcarrier spacing, the two frequency bands occupied by data transmissions by using different numerologies are separated by the guard tone, and no data transmission is performed on the guard tone, so that mutual interference of different subcarrier spacing will not occur. A bandwidth of the guard tone shown in FIG. 3 is 60 kHz.

Therefore, the method described in the implementation of the present disclosure avoids mutual interference between data transmissions based on different numerologies by setting the guard tone in the transmission resources configured for the terminal device.

Optionally, information of the target frequency band includes a start position and an end position of the target frequency band, a position of the guard tone in the target frequency band, and a bandwidth of the guard tone.

Specifically, when the network device 10 configures resources for uplink and downlink transmission for the terminal device 20, configuration information send by the network device needs to include a numerology for transmitting data and information of a target frequency band for transmitting the data. Herein a position of the target frequency band for transmitting the data may be indicated by a start position and an end position of the target frequency band, the target frequency hand defined by the start position and the end position includes the guard tone, and the information of the target frequency band also includes a position of the guard tone in the target frequency band.

Optionally, a position of the guard tone in the target frequency band includes a low-frequency end or a high-frequency end of the target frequency band, or includes a low-frequency end and a high-frequency end of the target frequency band.

Specifically, the network device 10 may allocate frequency domain resources used for uplink and downlink transmission to the terminal device 20 according to following four positional relationships between the guard tone and the target frequency band. That is, the guard tone is located at a low-frequency end of the target frequency band; the guard tone is located at a high-frequency end of the target frequency hand; the guard tone is located at both the high-frequency end and the low-frequency end of the target frequency band; or neither end of the target frequency band has a guard tone.

Herein, if a numerology used for data transmission in a transmission frequency band is different from a numerology used for data transmission in a frequency band adjacent to a low-frequency end of the target frequency band, a guard tone may be set at the low-frequency end of the target frequency band. If a numerology used for data transmission in a transmission frequency band is different from a numerology used for data transmission in a frequency band adjacent to a high-frequency end of a target frequency band, a guard tone may be set at a high-frequency end of the target frequency band. If a numerology used for data transmission in the transmission frequency band is different from a numerology used for data transmission in a frequency band adjacent to a low-frequency end of a target frequency band, and a numerology used for data transmission in the transmission frequency band is also different from the numerology used for data transmission in a frequency band adjacent to a high-frequency end of the target frequency band, the guard tone may be set at both the low-frequency end and the high-frequency end of the target frequency band. If a numerology used for data transmission in a transmission frequency band is the same as a numerology used for data transmission in a frequency band adjacent to a low-frequency end of a target frequency band, and a numerology used for data transmission in the transmission frequency band is the same as a numerology used for data transmission in a frequency band adjacent to a high-frequency end of the target frequency band, there may be no guard tone between the two adjacent bands. Therefore, the information of the target frequency band includes the position of the guard tone in the target frequency band, that is, which of the four positional relationships mentioned above is the positional relationship used for the guard tone.

It should be understood that the information of the guard tone may further include a start position and an end position of the target frequency band, as well as a start position and an end position of the guard tone. Herein, the guard tone formed by the start position and the end position of the guard tone may be located at the low-frequency end and/or the high-frequency end of the target frequency band. If the guard tone is located at both the low-frequency end and the high-frequency end of the target frequency band, the information of the target frequency band should include both start and end positions of the part of the guard tone located at the low-frequency end and start and end positions of the part of the guard tone located at the high-frequency end.

Optionally, a bandwidth of the guard tone is an integer multiple of the minimum subcarrier spacing supported by the network device 10.

Specifically, a bandwidth of the guard tone is further included in the information of the target frequency band. Since different numerologies are supported on a same carrier in the 5G communication system, bandwidths of guard tones should be able to cover frequency bands used for data transmissions based on different numerologies. Therefore, when the network device 10 determines the bandwidth of a guard tone, the minimum carrier spacing supported by the network device 10 is used as a unit. As shown in FIG. 3, for example, the communication system supports subcarrier spacing of 15 kHz and 30 kHz. When the network device 10 determines the bandwidth of a guard tone, 15 kHz is used as a basic unit, that is, the bandwidth of the guard tone should be an integer multiple of 15 kHz and less than the bandwidth of the target frequency band. If the guard tone is located at both the low-frequency end and the high-frequency end of the target frequency band, the bandwidth of the part of the guard tone located at the low-frequency end and the bandwidth of the part of the guard tone located at the high-frequency end should be integer multiples of 15 KHz.

It should be understood that in the configuration information sent by the network device 10 to the terminal device 20, the information of the target frequency band may further include a start position and an end position of the target frequency band, as well as a start position and an end position of the guard tone.

Optionally, the numerology includes subcarrier spacing.

The subcarrier spacing refers to frequency spacing between adjacent subcarriers, such as 15 kHz or 60 kHz. Parameters in the numerology include, but are not limited to, subcarrier spacing. For example, the numerology included in the configuration information sent by the network device 10 to the terminal device 20 may further include other parameters, such as a quantity of subcarriers of a specific bandwidth, a quantity of subcarriers in a physical resource block (PRB), a length of an orthogonal frequency division multiplexing (OFDM) symbol, a quantity of points of Fourier transform (such as Fast Fourier Transform (ITT), or inverse Fourier transform, e.g., Inverse Fast Fourier Transform (IFFT)) for generating OFDM signals, a quantity of OFDM symbols in a Transmission Time Interval (TTI), a quantity of TTIs contained in a specific time length, and a length of a signal prefix.

The numerology and target frequency band determined by the network device 10 for transmitting data are illustrated by following examples. It is assumed that the network device 10 configures transmission resources for transmitting uplink data for the terminal device 20 and the terminal device 30 respectively. The network device 10 configures subcarrier spacing for transmitting uplink data for the terminal device 20 to be 60 kHz and subcarrier spacing for transmitting uplink data for the terminal device 30 to be 30 kHz. The network device 10 configures start and end positions of the target frequency band for transmitting the uplink data for the terminal device 20 to be 1800 kHz and 1860 kHz respectively, and the network device 10 configures start and end positions of the target frequency band for transmitting the uplink data for the terminal device 30 to be 1860 kHz and 2000 kHz respectively. Since the subcarrier spacing used by the terminal device 20 and the subcarrier spacing used by the terminal device 30 are different, and a high-frequency end of a frequency band used by the terminal device 20 to transmit its uplink data is adjacent to a low-frequency end of a frequency band used by the terminal device 30 to transmit its uplink data, the network device 10 may set a guard tone at the high-frequency end of the target frequency band configured for the terminal device 20 or at the low-frequency end of the target frequency band configured for the terminal device 30. Assuming that minimum subcarrier spacing supported in the communication system is 30 kHz, a bandwidth of the guard tone is an integer multiple of 30 kHz. For example, a guard tone configured by the network device 10 for the terminal device 20 may be located at the high-frequency end of the target frequency band configured for the terminal device 20, and the bandwidth of the guard tone may be, for example, 30 kHz, that is, a start position and an end position of the guard tone are 1830 kHz and 1860 kHz respectively. For another example, a guard tone configured by the network device 10 for the terminal device 30 may be located at a low-frequency end of the target frequency band configured for the terminal device 30, and a bandwidth of the guard tone may be 60 kHz, that is, a start position and an end position of the guard tone are 1860 kHz and 1920 kHz respectively.

It should be understood that the transmission frequency band for transmitting the data in the target frequency band may be continuous or discontinuous. Frequency band resources in the target frequency band that are not used to transmit the data and do not belong to the guard tone, may be used for transmitting other data, or the like. The present disclosure is not limited to this.

In 220, the network device 10 sends configuration information to the terminal device 20.

Herein the configuration information includes the numerology and information of the target frequency band.

Specifically, after the network device 10 determines the numerology and the target frequency band for transmitting the data, the network device 10 sends the configuration information including the numerology and the target frequency band to the terminal device 20, so that the terminal device 20 uses the numerology to perform transmission of the data with the network device 10 in a frequency band for transmitting the data in the target frequency band according to the configuration information.

In 230, the terminal device 20 receives the configuration information sent by the network device 10.

Specifically, the network device 10 sends the configuration information to the terminal device 20. After receiving the configuration information sent by the network device 10, the terminal device 20 may perform data transmission with the network device 10 in a frequency band indicated by the configuration information according to the numerology in the configuration information.

Optionally, the configuration information may further include a filtering mode corresponding to the numerology.

Specifically, if the configuration information further includes a filtering mode corresponding to the numerology, the terminal device 20 may filter the received or to-be-transmitted data according to the filtering mode indicated by the configuration information.

In this case, before the network device 10 sends the configuration information to the terminal device 20, that is, before executing act 220, the method further includes: the network device 10 determines the filtering mode corresponding to the numerology.

Optionally, the filtering mode includes at least one of: a type of a baseband filter (which may simply be referred to as "filter"), parameters of the baseband filter, a filtering waveform adopted, and parameters of the filtering waveform.

Figure 4:
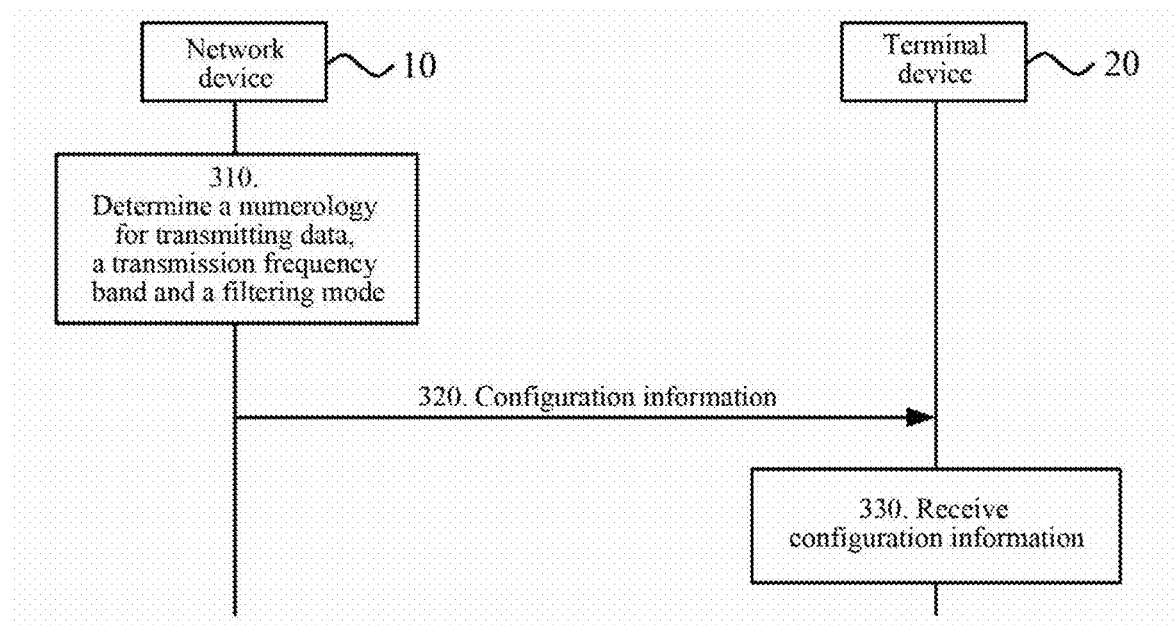
FIG. 4 is a schematic diagram of an interaction flow in a method for transmitting data according to another implementation of the present disclosure.

FIG. 4 shows a schematic diagram of an interaction flow in a method for transmitting data according to another implementation of the present disclosure. A network device 10 and terminal device 20 are shown in FIG. 4. As shown in FIG. 4, a specific flow for transmitting data includes acts 310-330.

In 310, the network device 10 determines a numerology for transmitting data, a transmission frequency band for transmitting the data, and a filtering mode corresponding to the numerology.

Specifically, if frequency bands used for data transmissions based on different numerologies are adjacent, in order to prevent interference between different numerologies during frequency division multiplexing, the network device 10 may configure the terminal device 20 with an appropriate filtering mode corresponding to the numerology, such as a type of a filter and/or waveform, to reduce mutual interference between data transmissions based on different numerologies. The type of the filter and the waveform may be predetermined in the system.

Therefore, by using different filtering modes to process data transmitted based on different numerologies, mutual interference between data transmissions based on different numerologies can be reduced.

Optionally, the filtering mode may include at least one of a type of a baseband filter, parameters of the baseband filter, a filtering waveform adopted, and parameters of the filtering waveform.

Specifically, the network device 10 configures the terminal device 20 with a numerology and a transmission frequency band for transmitting data, and further configures the terminal device 20 with a filtering mode for filtering the data corresponding to the numerology. When data transmitted based on different numerologies are filtered, different filters may be used, or a same filter with different parameters may be used, or different filtering waveforms may be used, or different parameters of the same filtering waveform may be used.

In a 5G communication system, data transmitted based on different numerologies may need to be used with different waveforms or filters during baseband processing. For example, common waveforms used with orthogonal frequency division multiplexing (OFDM) signals are windowing OFDM (w-OFDM) and filtered OFDM (f-OFDM). Taking w-OFDM as an example, an OFDM signal, after generated, are multiplied by a window function in the time domain, such as raised-cosine window that is commonly used, $w(n)=0.5\{1-\cos[2*pi*n/(N-1)]\}$, where n is a sampling time of time domain, N is a configurable parameter, and the window function listed above can be regarded as a time domain filter and N is a filter parameter.

For example, the network device 10 configures the terminal device 20 with subcarrier spacing of 60 kHz, a filtering waveform of w-OFDM, a transmission frequency band of 1800 kHz-1830 kHz for transmitting uplink data, and the network device 10 configures the terminal device 30 with subcarrier spacing of 30 kHz, a filtering waveform of f-OFDM, and a transmission frequency band of 1920 kHz-2000 kHz for transmitting downlink data. Then, after the terminal device 20 receives the configuration information sent by the network device 10, the terminal device 20 processes uplink data to be transmitted according to the w-OFDM waveform, and uses the subcarrier spacing of 30 kHz, and sends the uplink data to the network device 10 on the frequency band 1800 kHz-1830 kHz. After the terminal device 30 receives the configuration information sent by the network device 10, the terminal device 30 receives the downlink data sent by the network device 10 on the frequency band 1920 kHz-2000 kHz according to the subcarrier spacing of 30 kHz, and processes the received data according to the f-OFDM waveform.

Optionally, in 310, the network device 10 may determine a numerology for transmitting data, a transmission frequency band for transmitting the data, and a filtering mode corresponding to the numerology, and the network device 10 may further determine a guard tone adjacent to the transmission frequency band. Herein, one end of the guard tone is adjacent to the transmission frequency band, and the terminal device 20 is not allowed to transmit data in the guard tone to isolate the transmission frequency band for transmitting the data from the transmission frequency band adjacent to the other end of the guard tone.

In 320, the network device 10 sends configuration information to the terminal device 20.

The configuration information includes a numerology for transmitting the data, a transmission frequency band for transmitting the data, and a filtering mode corresponding to the numerology.

Specifically, after the network device 10 determines a numerology for transmitting the data, a transmission frequency band for transmitting the data, and a filtering mode corresponding to the numerology, the network device 10 sends configuration information including the transmission frequency band for transmitting the data, the numerology, and the filtering mode to the terminal device 20, so that the terminal device 20 filters the data by using the filtering mode according to the configuration information, and performs transmission of the data with the network device 10 on the transmission frequency band by using the numerology.

Optionally, the configuration information may further include information of a guard tone adjacent to the transmission frequency band. The information of the guard tone may include a positional relationship between the guard tone and the transmission frequency band, as well as a bandwidth of the guard tone. The positional relationship between the guard tone and the transmission frequency band may include that the guard tone is adjacent to the low-frequency end of the transmission frequency band and/or the guard tone is adjacent to the high-frequency end of the transmission frequency band.

In 330, the terminal device 20 receives the configuration information sent by the network device 10.

Specifically, the network device 10 sends configuration information to the terminal device 20. After receiving the configuration information sent by the network device 10, the terminal device 20 may filter the data according to the filtering mode and performs transmission of the data with the network device 10 on the frequency band indicated by the configuration information according to the numerology in the configuration information.

Figure 5:
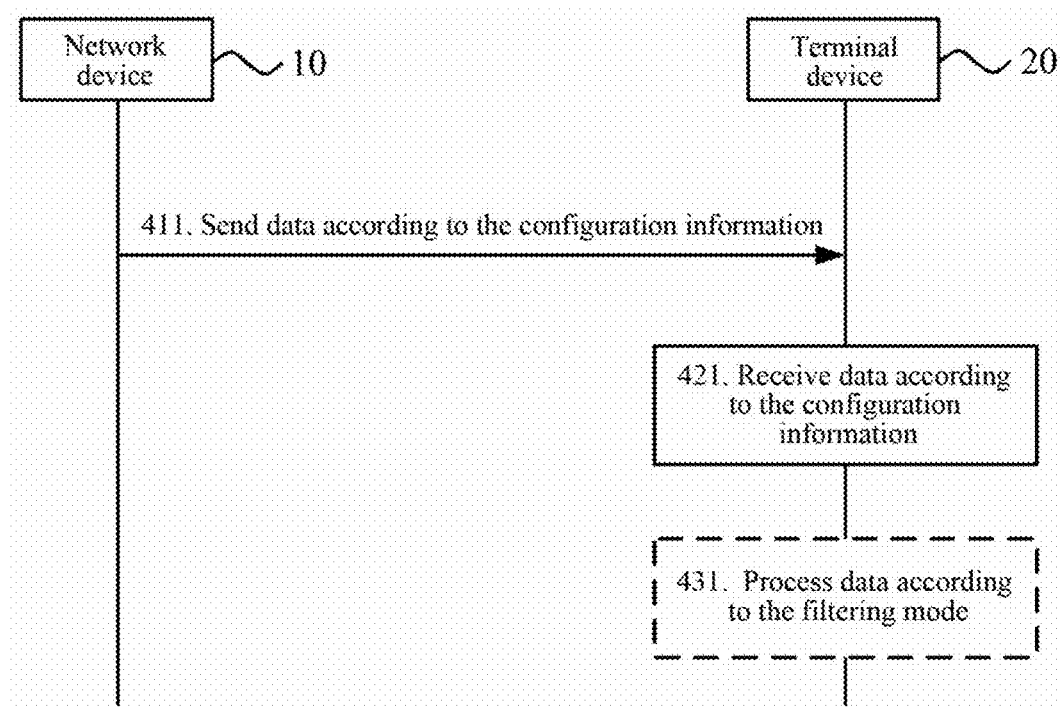
FIG. 5 is a schematic diagram of an interaction flow in a method for transmitting data according to an implementation of the present disclosure.

Optionally, according to the method for transmitting data shown in FIGS. 2 and 4, after act 230 or 330, the method may further include acts 411 and 421, such as a method for transmitting data according to another implementation of the present disclosure shown in FIG. 5.

In 411, the network device 10 sends the data to the terminal device 20 according to the configuration information.

Specifically, the network device 10 may send the data to the terminal device 20 on a frequency band for transmitting the data in the target frequency band according to parameters in the numerology.

In 421, the terminal device 20 receives the data transmitted by the network device 10 according to the configuration information.

Specifically, the terminal device 20 receives the data transmitted by the network device 10 on the frequency band for transmitting the data in the target frequency band according to the parameters in the numerology.

If the configuration information further includes a filtering mode corresponding to the numerology, after act 421, the method further includes act 431.

In 431, the terminal device 20 processes the received data according to the filtering mode.

Figure 6:
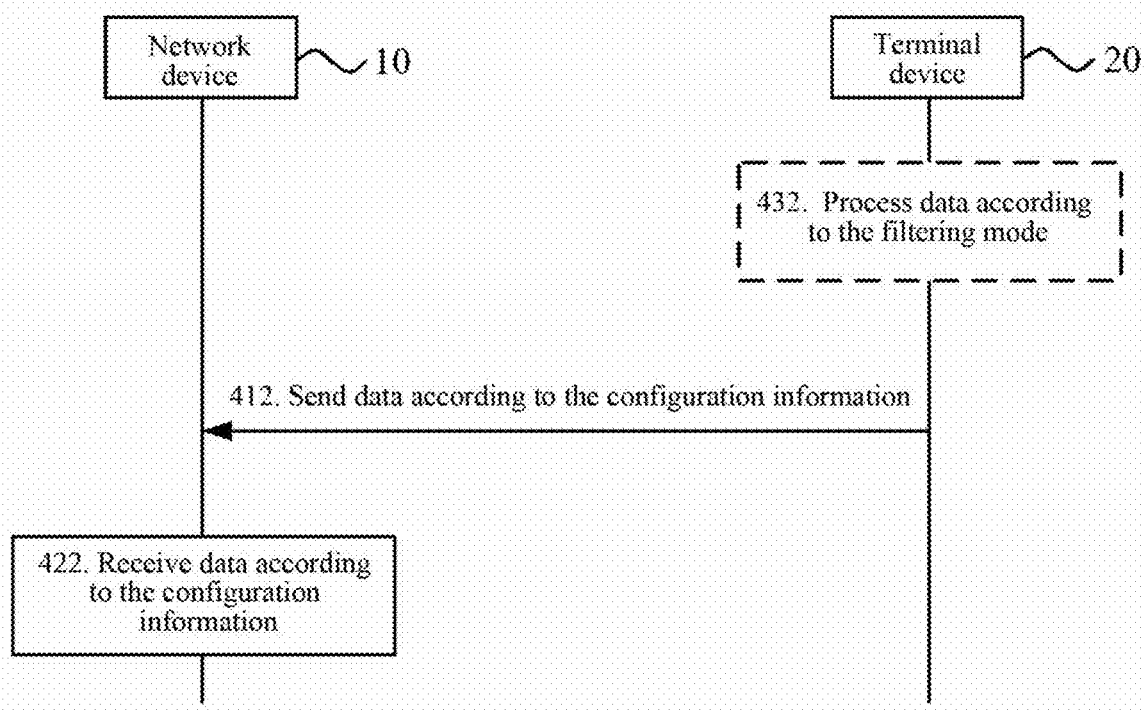
FIG. 6 is a schematic diagram of an interaction flow in a method for transmitting data according to an implementation of the present disclosure.

Specifically, the terminal device 20 filters the received data according to the filtering mode, such as an appropriate type of a baseband filter or a filtering waveform, indicated in the configuration information sent by the network device 10. Optionally, acts 411 and 421 may be replaced by acts 412 and 422 respectively, as shown in FIG. 6. FIG. 6 is a schematic diagram of an interaction flow in a method for transmitting data according to another implementation of the present disclosure.

In 412, the terminal device 20 sends the data to the network device 10 according to the configuration information.

Specifically, the terminal device 20 may transmit the data to the network device 10 on a frequency band for transmitting the data in the target frequency band according to parameters in the numerology.

In 422, the network device 10 receives the data sent by the terminal device 20 according to the configuration information.

Specifically, the network device 10 receives the data transmitted by the terminal device 20 on the frequency band for transmitting the data in the target frequency band according to the parameters in the numerology.

If the configuration information further includes a filtering mode corresponding to the numerology, before act 421, the method includes act 432.

In 432, the terminal device 20 processes the data according to the filtering mode.

Specifically, the terminal device 20 filters the data to be sent according to the filtering mode indicated in the configuration information sent by the network device 10, such as an appropriate type of a baseband filter or a filtering waveform, and sends the processed data to the network device.

It should be understood that the data currently transmitted between the terminal device 20 and the network device 10 may include uplink data or downlink data. If the transmitted data is downlink data, the network device 10 sends the data to the terminal device 20, and the configuration information is configuration information for scheduling the downlink data. After the network device 10 sends the downlink data to the terminal device 20, the terminal device 20 correctly receives the downlink data sent by the network device 10 according to the configuration information, that is, acts 411 and 421 are performed. If the transmitted data is uplink data, the terminal device 20 transmits the data to the network device 30, and the configuration information is configuration information for scheduling the uplink data, the terminal device 20 sends the uplink data to the network device 10 according to the configuration information, and the network device 10 receives the uplink data sent by the terminal device 20, that is, acts 412 and 422 are performed.

It should be understood that the data transmissions between the network device 10 and the terminal device 20 in the implementation of the present disclosure may include transmission of service data or transmission of control signaling, which is not limited herein.

Therefore, the method described in the implementation of the present disclosure avoids mutual interference between data transmissions based on different numerologies by configuring a guard tone or configuring a filtering mode corresponding to the numerology.

It should be understood that in various implementations of the present disclosure, the values of the sequence numbers in the above-mentioned processes do not indicate the order of execution, and the order of execution of various processes should be determined by its function and internal logic, and should not constitute any limitation on the implementation process of the implementations of the present disclosure.

The method for transmitting data according to the implementation of the present disclosure has been described in detail above, and the network device and the terminal device according to the implementation of the present disclosure will be described below. It should be understood that the network device and the terminal device of implementations of the present disclosure may perform various methods of the aforementioned implementation of the present disclosure, that is, specific working processes of following various devices may refer to the corresponding processes in the aforementioned method implementation.

Figure 7:
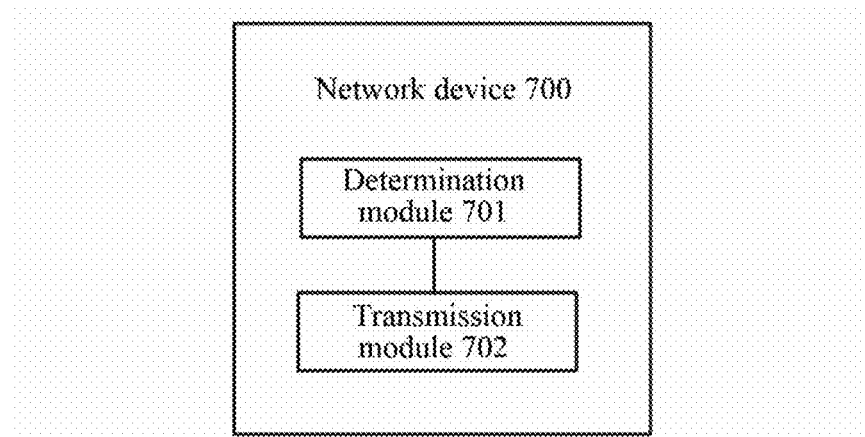
FIG. 7 is a block diagram of structure of a network device according to an implementation of the present disclosure.

FIG. 7 shows a schematic block diagram of a network device 700 according to an implementation of the present disclosure. As shown in FIG. 7, the network device 700 includes a determination module 701 and a transmission module 702.

The determination module 701 is configured to determine a numerology for transmitting data and determine a target frequency band for transmitting the data, the target frequency band including a transmission frequency band for transmitting the data and a guard tone.

The transmission module 702 is configured to send configuration information determined by the determination module 701 to a terminal device, the configuration information including the numerology and information of the target frequency band.

The transmission module 702 is further configured to receive the data sent by the terminal device or send the data to the terminal device on the transmission frequency band determined by the determination module 701 according to the numerology determined by the determination module 701.

Therefore, the network device described in the implementation of the present disclosure avoids mutual interference between data transmissions based on different numerologies by setting a guard tone in the transmission resources configured for the terminal device.

Optionally, the information of the target frequency band includes a start position and an end position of the target frequency band, a bandwidth of the guard tone, and a position of the guard tone in the target frequency band.

Optionally, the information of the target frequency band includes a start position and an end position of the target frequency band, and a start position and an end position of the guard one.

Optionally, the position of the guard tone in the target frequency band includes a low-frequency end and/or a high-frequency end of the target frequency band where the guard tone is located.

Optionally, the bandwidth of the guard tone is an integer multiple of minimum subcarrier spacing supported by the network device.

Optionally, the configuration information further includes a filtering mode corresponding to the numerology, and the determination module 701 is further configured to determine the filtering mode corresponding to the numerology before the transmission module 702 sends the configuration information to the terminal device.

Optionally, the filtering mode includes at least one of: a type of a baseband filter, parameters of the baseband filter, a filtering waveform adopted, and parameters of the filtering waveform.

Optionally, the numerology includes subcarrier spacing.

Optionally, the determination module 701 is specifically configured to determine the numerology for transmitting the data from a plurality of predefined numerologies.

Figure 8:
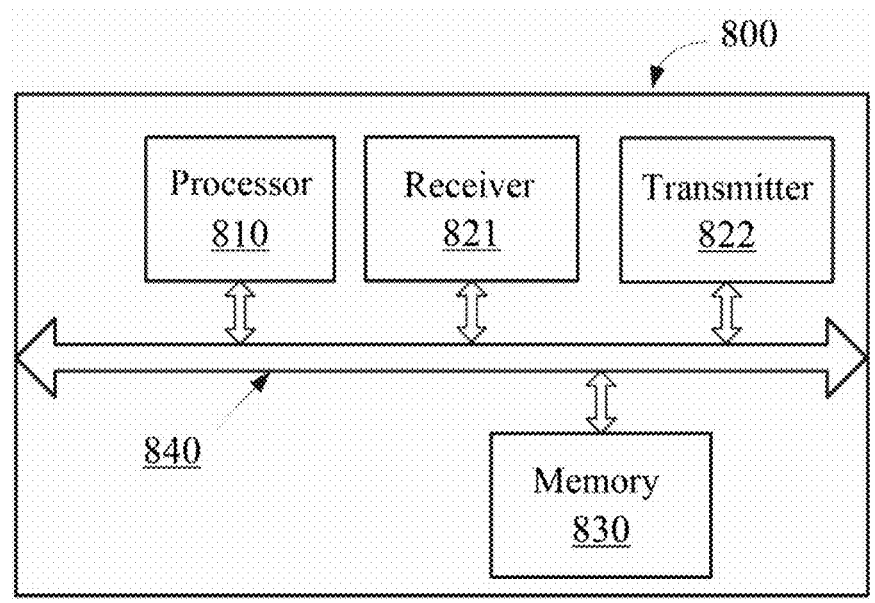
FIG. 8 is a block diagram of structure of a network device according to an implementation of the present disclosure.

It should be noted that in an implementation of the present disclosure, the determination module 701 may be implemented by a processor and the transmission module 702 may be implemented by a transceiver. As shown in FIG. 8, the network device 800 may include a processor 810, a transceiver 820, and a memory 830. Herein, the transceiver 820 may include a receiver 821 and a transmitter 822, and the memory 830 may be used to store relevant information such as numerologies, guard tones, and filtering modes, and may be further configured to store codes executed by the processor 810, etc. The various components in the network device 800 are coupled together by a bus system 840, which includes a power bus, a control bus, a status signal bus, etc., in addition to a data bus.

The processor 810 is specifically configured to determine a numerology for transmitting data and determine a target frequency band for transmitting the data, the target frequency band including a transmission frequency band for transmitting the data and a guard tone; the transceiver 820 is configured to send configuration information determined by the processor to the terminal device, the configuration information including the numerology and information of the target frequency band; and according to the numerology determined by the processor, receive the data sent by the terminal device or send the data to the terminal device on the transmission frequency band determined by the processor.

Optionally, the information of the target frequency band includes a start position and an end position of the target frequency band, a bandwidth of the guard tone, and a position of the guard tone in the target frequency band.

Optionally, the information of the target frequency band includes a start position and an end position of the target frequency band, and a start position and an end position of the guard tone.

Optionally, the position of the guard tone in the target frequency band includes a low-frequency end and/or a high-frequency end of the target frequency band where the guard tone is located.

Optionally, the bandwidth of the guard tone is an integer multiple of minimum subcarrier spacing supported by the network device.

Optionally, the configuration information further includes a filtering mode corresponding to the numerology, and the processor 810 is further configured to determine the filtering mode corresponding to the numerology before the transceiver 820 sends the configuration information to the terminal device.

Optionally, the filtering mode includes at least one of: a type of a baseband filter, parameters of the baseband filter, a filtering waveform adopted, and parameters of the filtering waveform.

Optionally, the numerology includes subcarrier spacing.

Optionally, the processor 810 is specifically configured to determine the numerology for transmitting the data from a plurality of predefined numerologies.

Figure 9:
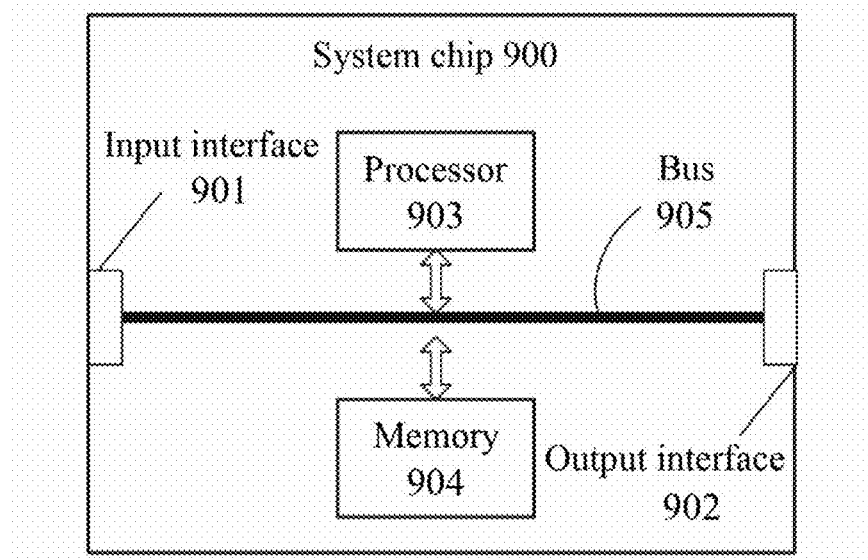
FIG. 9 is a schematic diagram of structure of a system chip according to an implementation of the present disclosure.

FIG. 9 is a schematic diagram of structure of a system chip according to an implementation of the present disclosure. A system chip 900 in FIG. 9 includes an input interface 901, an output interface 902, at least one processor 903, and a memory 904. The input interface 901, the output interface 902, the processor 903, and the memory 904 are connected through a bus 905. The processor 903 is configured to execute codes in the memory 904. When the codes are executed, the processor 903 implements the methods executed by the network device 10 in FIGS. 2 to 6.

The network device 700 shown in FIG. 7, the network device 800 shown in FIG. 8, or the system chip 900 shown in FIG. 9 can implement the various processes implemented by the network device 10 in the method implementations of FIGS. 2 to 6 described above. In order to avoid duplication, the details will not be repeated here.

Figure 10:
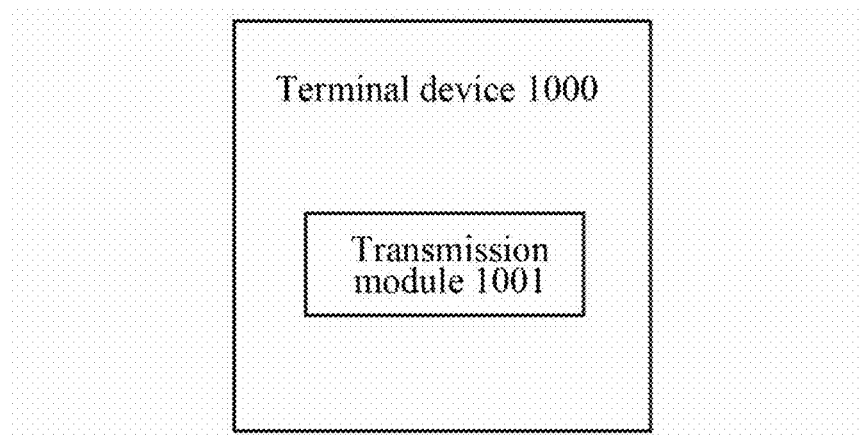
FIG. 10 is a block diagram of structure of a terminal device according to an implementation of the present disclosure.

FIG. 10 shows a schematic block diagram of a terminal device 1000 according to an implementation of the present disclosure. As shown in FIG. 10, the terminal device 1000 includes a transmission module 1001. The transmission module 1001 is configured to receive configuration information sent by a network device, wherein the configuration information includes a numerology and information of a target frequency band for transmitting data, and the target frequency band includes a transmission frequency band for transmitting the data and a guard tone; and according to the numerology, send the data to the network device or receive the data sent by the network device on the transmission frequency band.

Therefore, the terminal device described in the implementation of the present disclosure avoids mutual interference between data transmissions based on different numerologies through the guard tone set in the transmission resources.

Optionally, information of the target frequency band includes a start position and an end position of the target frequency band, a bandwidth of the guard tone, and a position of the guard tone in the target frequency band.

Optionally, information of the target frequency band includes a start position and an end position of the target frequency band, and a start position and an end position of the guard tone.

Optionally, the position of the guard tone in the target frequency band includes a low-frequency end and/or a high-frequency end of the target frequency band where the guard is located.

Optionally, a bandwidth of the guard tone is an integer multiple of minimum subcarrier spacing supported by the network device.

Optionally, the configuration information further includes a filtering mode corresponding to the numerology, and the transmission module 1001 is specifically configured to process the data according to the filtering mode and send the processed data to the network device on the target frequency band according to the numerology; or, receive the data sent by the network device according to the numerology and process the received data according to the filtering mode.

Optionally, the filtering mode includes at least one of: a type of a baseband filter, parameters of the baseband filter, a filtering waveform adopted, and parameters of the filtering waveform.

Optionally, the numerology includes subcarrier spacing.

Figure 11:
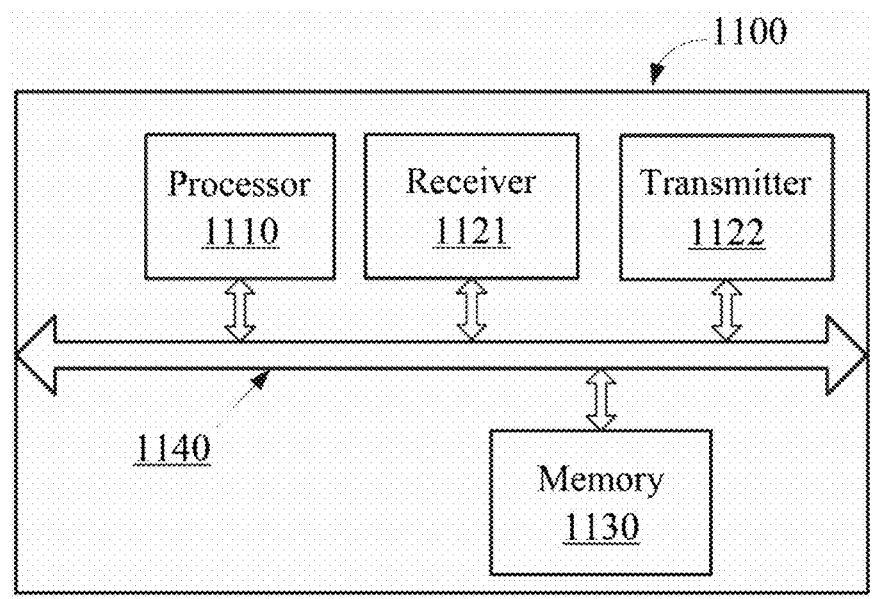
FIG. 11 is a block diagram of structure of a terminal device according to an implementation of the present disclosure.

It should be noted that, in an implementation of the present disclosure, the transmission module 1001 may be implemented by a transceiver. As shown in FIG. 11, the terminal device 1100 may include a processor 1110, a transceiver 1120, and a memory 1130. The transceiver 1120 may include a receiver 1121 and a transmitter 1122, and the memory 1130 may be configured to store relevant information, such as, numerologies and filtering modes, and may be further configured to store codes executed by the processor 1110. The various components in the terminal device 1100 are coupled together by a bus system 1140, which includes a power bus, a control bus, a status signal bus, etc., in addition to a data bus.

The transceiver 1120 is configured to receive configuration information sent by a network device, and the configuration information includes a numerology and information of a target frequency band for transmitting data, the target frequency band includes a transmission frequency band for transmitting the data and a guard tone; according to the numerology, send the data to the network device or receive the data sent by the network device on the transmission frequency band.

Optionally, the information of the target frequency band includes a start position and an end position of the target frequency band, a bandwidth of the guard tone, and a position of the guard tone in the target frequency band.

Optionally, the information of the target frequency band includes a start position and an end position of the target frequency band, and a start position and an end position of the guard tone.

Optionally, the position of the guard tone in the target frequency band includes a low-frequency end and/or a high-frequency end of the target frequency band where the guard tone is located.

Optionally, the bandwidth of the guard tone is an integer multiple of minimum subcarrier spacing supported by the network device.

Optionally, the configuration information further includes a filtering mode corresponding to the numerology, and the transceiver 1120 is specifically configured to process the data according to the filtering mode and send the processed data to the network device in the target frequency band according to the numerology; or, receive the data sent by the network device according to the numerology and process the received data according to the filtering mode.

Optionally, the filtering mode includes at least one of: a type of a baseband filter, parameters of the baseband filter, a filtering waveform adopted, and parameters of the filtering waveform.

Optionally, the numerology includes subcarrier spacing.

Figure 12:
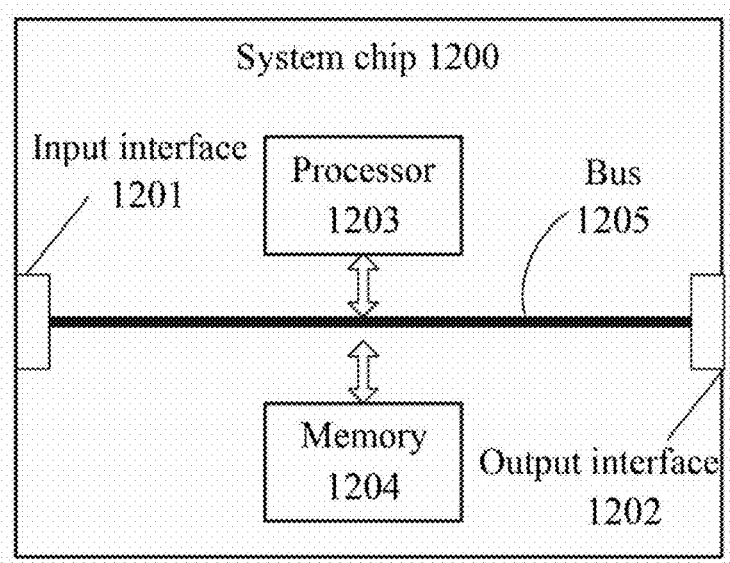
FIG. 12 is a schematic diagram of structure of a system chip according to an implementation of the present disclosure.

FIG. 12 is a schematic diagram of structure of a system chip according to an implementation of the present disclosure. The system chip 1200 of FIG. 12 includes an input interface 1201, an output interface 1202, at least one processor 1203, and a memory 1204. The input interface 1201, the output interface 1202, the processor 1203, and the memory 1204 are connected through a bus 1205. The processor 1203 is configured to execute codes in the memory 1204. When the codes are executed, the processor 1203 implements the method performed by the terminal device 20 in FIGS. 2 to 6.

The terminal device 1000 shown in FIG. 10 or the terminal device 1100 shown in FIG. 11 or the system chip 1200 shown in FIG. 12 can implement the various processes implemented by the terminal device 20 in the method implementations of FIGS. 2 to 6 described above. In order to avoid duplication, the details will not be repeated here.

Figure 13:
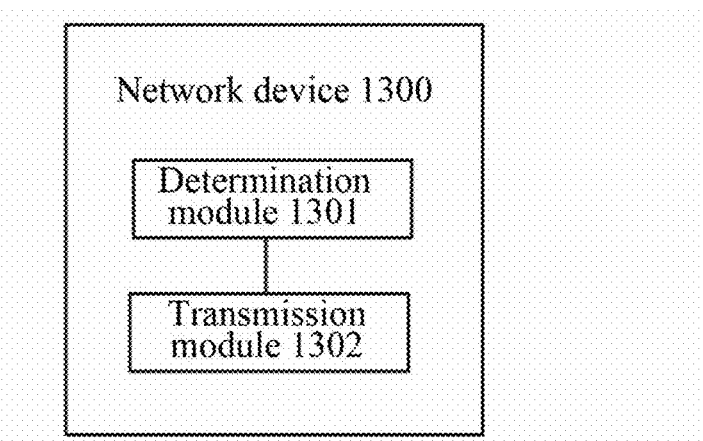
FIG. 13 is a block diagram of structure of a network device according to another implementation of the present disclosure.

FIG. 13 shows a schematic block diagram of a network device 1300 according to another implementation of the present disclosure. As shown in FIG. 13, the network device 1300 includes a determination module 1301 and a transmission module 1302.

The determination module 1301 is configured to determine a numerology for transmitting data, a transmission frequency band for transmitting the data, and a filtering mode corresponding to the numerology.

The transmission module 1302 is configured to send configuration information including the numerology, the transmission frequency band, and the filtering mode to the terminal device; according to the numerology, receive the data sent by the terminal device or send the data to the terminal device on the transmission frequency band.

Therefore, by using different filtering modes to process data transmitted based on different numerologies, mutual interference between data transmissions based on different numerologies can be reduced.

Optionally, the filtering mode includes at least one of: a type of a baseband filter, parameters of the baseband filter, a filtering waveform adopted, and parameters of the filtering waveform.

Optionally, the numerology includes subcarrier spacing.

Optionally, the determination module 1301 is specifically configured to determine the numerology for transmitting the data from a plurality of predefined numerologies.

Figure 14:
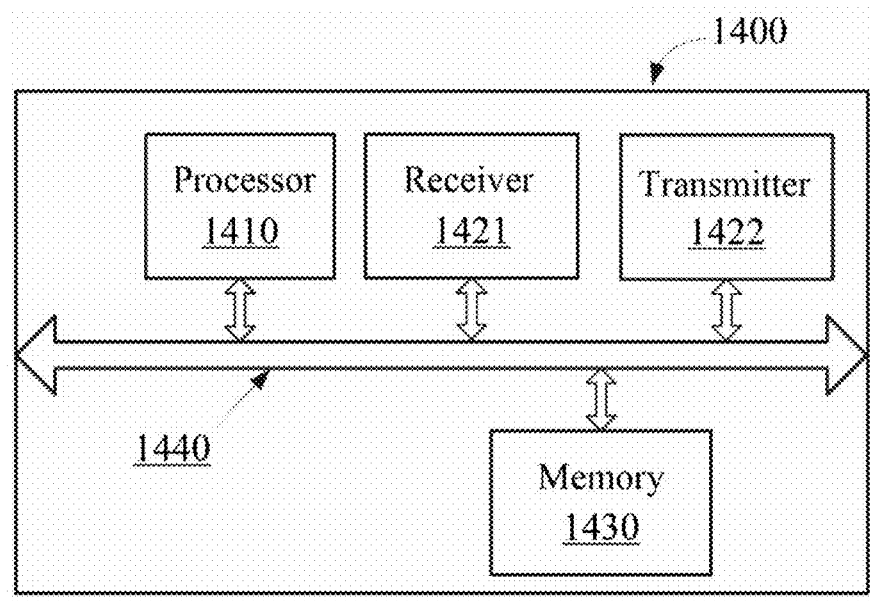
FIG. 14 is a block diagram of structure of a network device according to another implementation of the present disclosure.

It should be noted that in an implementation of the present disclosure, the determination module 1301 may be implemented by a processor and the transmission module 1302 may be implemented by a transceiver. As shown in FIG. 14, the network device 1400 may include a processor 1410, a transceiver 1420, and a memory 1430. The transceiver 1420 may include a receiver 1421 and a transmitter 1422, and the memory 1430 may be configured to store relevant information, such as numerologies, guard tones, and filtering modes, and may be further configured to store codes executed by the processor 1410, etc. The various components in the network device 1400 are coupled together by a bus system 1440, which includes a power bus, a control bus, a status signal bus, etc., in addition to a data bus.

The processor 1410 is specifically configured to determine a numerology for transmitting data, a transmission frequency band for transmitting the data, and a filtering mode corresponding to the numerology; the transceiver 1420 is configured to send configuration information including the numerology, the transmission frequency band, and the filtering mode to the terminal device; according to the numerology, receive the data sent by the terminal device or send the data to the terminal device on the transmission frequency band.

Optionally, the filtering mode includes at least one: a type of a baseband filter, parameters of the baseband filter, a filtering waveform adopted, and parameters of the filtering waveform.

Optionally, the numerology includes subcarrier spacing.

Optionally, the processor 1410 is specifically configured to determine the numerology for transmitting the data from a plurality of predefined numerologies.

Figure 15:
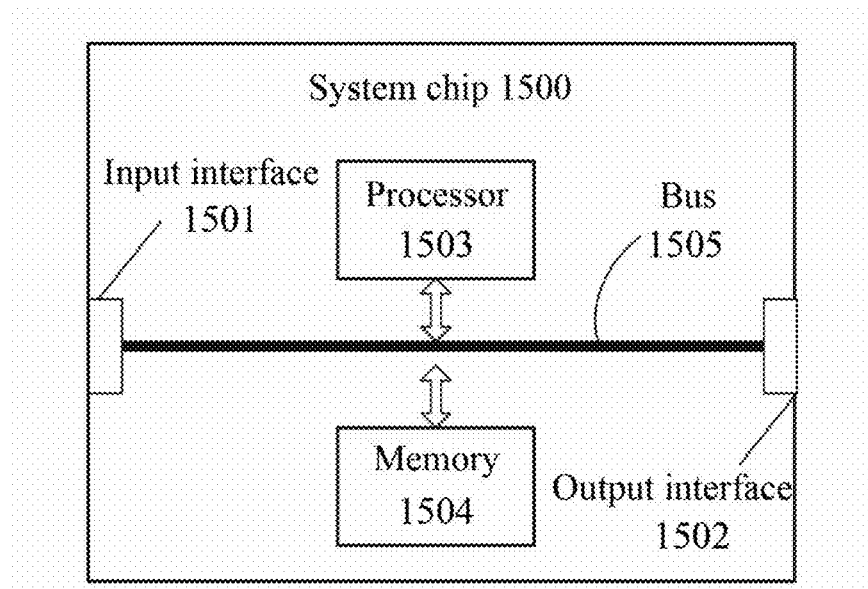
FIG. 15 is a schematic diagram of structure of a system chip according to another implementation of the present disclosure.

FIG. 15 is a schematic diagram of structure of a system chip according to an implementation of the present disclosure. The system chip 1500 of FIG. 15 includes an input interface 1501, an output interface 1502, at least one processor 1503, and a memory 1504. The input interface 1501, the output interface 1502, the processor 1503, and the memory 1504 are connected through a bus 1505. The processor 1503 is configured to execute codes in the memory 1504. When the codes are executed, the processor 1503 implements the method executed by the network device 10 in FIGS. 2 to 6.

The network device 1300 shown in FIG. 13 or the network device 1400 shown in FIG. 14 or the system chip 1500 shown in FIG. 15 can implement the various processes implemented by the network device 10 in the method implementations of FIGS. 2 to 6 described above. In order to avoid duplication, the details will not be repeated here.

Figure 16:
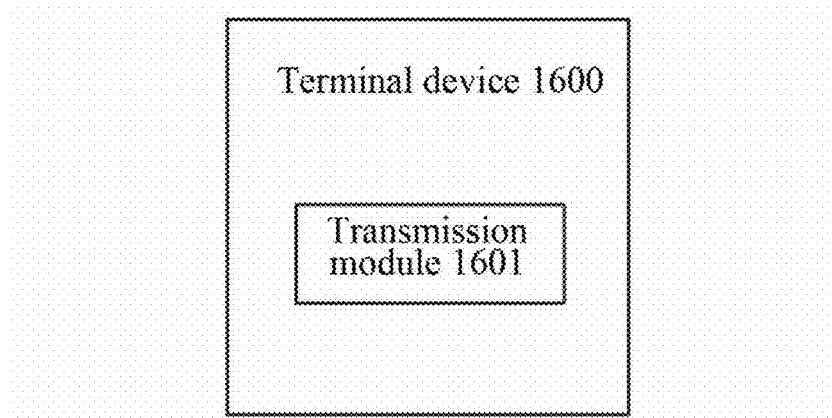
FIG. 16 is a block diagram of structure of a terminal device according to another implementation of the present disclosure.

FIG. 16 shows a schematic block diagram of a terminal device 1600 according to another implementation of the present disclosure. As shown in FIG. 16, the terminal device 1600 includes a transmission module 1601.

The transmission module is configured to receive configuration information sent by a network device, and the configuration information includes a numerology for transmitting data, a transmission frequency band for transmitting the data and a filtering mode corresponding to the numerology; process the data according to the filtering mode, and send the processed data to the network device on the target frequency band according to the numerology; or according to the numerology, receive the data sent by the network device, and process the received data according to the filtering mode.

Therefore, by using different filtering modes to process data transmitted based on different numerologies, mutual interference between data transmissions based on different numerologies can be reduced.

Optionally, the filtering mode includes at least one of: a type of a baseband filter, parameters of the baseband filter, a filtering waveform adopted, and parameters of the filtering waveform.

Optionally, the numerology includes subcarrier spacing.

Figure 17:
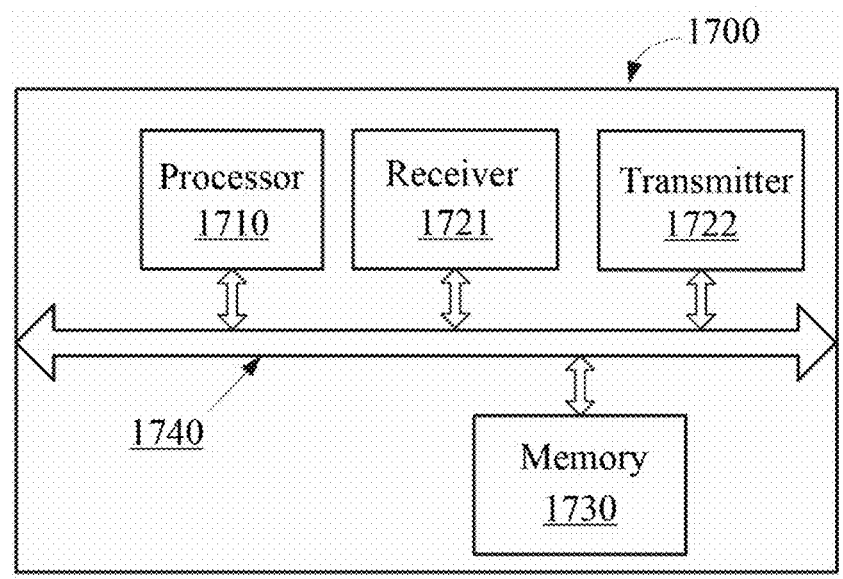
FIG. 17 is a block diagram of structure of a terminal device according to another implementation of the present disclosure.

It should be noted that in an implementation of the present disclosure, the transmission module 1601 may be implemented by a transceiver. As shown in FIG. 17, a terminal device 1700 may include a processor 1710, a transceiver 1720, and a memory 1730. The transceiver 1720 may include a receiver 1721 and a transmitter 1722, and the memory 1730 may be configured to store information, such as numerologies, and filtering modes, and may be further configured to store codes executed by the processor 1710, etc. The various components in the network device 1700 are coupled together by a bus system 1740, which includes a power bus, a control bus, a status signal bus, etc., in addition to a data bus.

The transceiver 1720 is configured to receive configuration information sent by a network device, the configuration information including a numerology for transmitting data, a transmission frequency band for transmitting the data, and a filtering mode corresponding to the numerology; process the data according to the filtering mode, and send the processed data to the network device in the target frequency band according to the numerology; or, receive the data sent by the network device according to the numerology and process the received data according to the filtering mode.

Optionally, the filtering mode includes at least one of: a type of a baseband filter, parameters of the baseband filter, a filtering waveform adopted, and parameters of the filtering waveform.

Optionally, the numerology includes subcarrier spacing.

Figure 18:
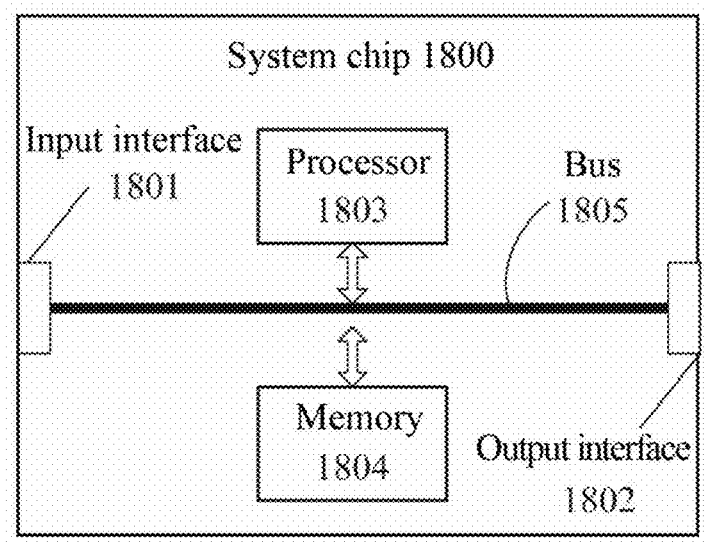
FIG. 18 is a schematic diagram of structure of a system chip according to another implementation of the present disclosure.

FIG. 18 is a schematic diagram of structural of a system chip according to an implementation of the present disclosure. A system chip 1800 of FIG. 18 includes an input interface 1801, an output interface 1802, at least one processor 1803, and a memory 1804. The input interface 1801, the output interface 1802, the processor 1803, and the memory 1804 are connected through a bus 1805. The processor 1803 is configured to execute codes in the memory 1804. When the codes are executed, the processor 1803 implements the method executed by the terminal device 20 in FIGS. 2 to 6.

The terminal device 1600 shown in FIG. 16 or the terminal device 1700 shown in FIG. 17 or the system chip 1800 shown in FIG. 18 can implement the various processes implemented by the terminal device 20 in the method implementations of FIGS. 2 to 6 described above, and will not be described here in detail in order to avoid duplication.

It should be understood that the processor in the implementation of the present disclosure may be an integrated circuit chip with a capability for processing signals. In the implementation process, the acts of the method implementations described above may be completed by integrated logic circuits of hardware in the processor or instructions in the form of software. The above processor may be a general purpose processor, a digital signal processor (DSP), an application specific integrated circuit (ASIC), a field programmable gate array (FPGA) or other programmable logic devices, discrete gate or transistor logic devices, and discrete hardware components, which may implement methods, acts and logic block diagrams disclosed in implementations of the present disclosure. The general purpose processor may be a microprocessor or the processor may be any conventional processor or the like. The acts of the method disclosed in connection with the implementation of the present disclosure can be directly embodied by the execution of the hardware decoding processor or by the combination of hardware and software modules in the decoding processor. The software modules may be located in a storage medium commonly used in the art, such as a random access memory, flash memory, read-only memory, programmable read-only memory or electrically erasable programmable memory, or register. The storage medium is located in the memory, and the processor reads the information in the memory and completes the acts of the above method in combination with its hardware.

It should be understood that the memory in implementations of the present disclosure may be a transitory memory or non-transitory memory, or may include both transitory and non-transitory memory. The non-transitory memory may be a read-only memory (ROM), programmable ROM (PROM), erasable programmable ROM (EPROM), electrically erasable programmable ROM (EEPROM) or flash memory. The transitory memory may be a random access memory (RAM) which serves as an external cache. By way of example, but not limitation, many forms of RAMs are available, such as, a static random access memory (SRAM), dynamic random access memory (DRAM), synchronous dynamic random access memory (SDRAM), double data rate synchronous dynamic random access memory (DDR SDRAM), enhanced synchronous dynamic random access memory (ENHANCED SDRAM), synchronous connection dynamic random access memory (Synchlink DRAM, SLDRAM) and direct memory bus random access memory (Direct Rambus RAM, for short). It should be noted that the memories of the systems and methods described herein are intended to include, but are not limited to, these and any other suitable types of memories.

In addition, the terms "system" and "network" are often used interchangeably herein. The term "and/or" in this document is merely an association relationship describing an associated object, indicating that there may be three relationships, for example, a and/or b may indicate three situations: a alone, a and b, and b alone. In addition, the symbol "/" in this document generally indicates that objects of the former and the latter connected by "/"has an "or" relationship.

It should be understood that in an implementation of the present disclosure, "B corresponding to A" means that B is associated with A, and B may be determined according to A. However, it should be further understood that determining B according to A does not mean determining B only according to A, but also according to A and/or other information.

Those of ordinary skill in the art will recognize that the exemplary elements and algorithm acts described in connection with the implementations disclosed herein can be implemented in electronic hardware, or a combination of computer software and electronic hardware. Whether these functions are implemented in hardware or software depends on the specific application and design constraints of the technical solution. One skilled in the art may use different methods to implement the described functions for each particular application, but such implementation should not be considered to be beyond the scope of the present disclosure.

Those skilled in the art can clearly understand that for convenience and conciseness of description, the specific working process of the system, apparatus and unit described above may refer to the corresponding process in the aforementioned method implementation and will not be described here.

In several implementations provided by the present disclosure, it should be understood that the disclosed system, device and method may be implemented in other ways. For example, the device implementations described above are only illustrative, for example, the division of the units is only logical function division, and there may be other division modes in actual implementations, for example, multiple units or components may be combined or integrated into another system, or some features may be ignored or not executed. On the other hand, the mutual coupling or direct coupling or communication connection shown or discussed may be indirect coupling or communication connection through some interfaces, devices or units, and it may be in electrical, mechanical or other forms.

The unit described as a separate unit may or may not be physically separated, and the component shown as a unit may or may not be a physical unit, i.e., may be located in one place or may be distributed over multiple network units. Some or all of the elements can be selected according to actual needs to achieve the purpose of this implementation.

In addition, each functional unit in various implementations of the present disclosure may be integrated in one processing unit, may be physically present in each unit alone, or may be integrated in one unit with two or more units.

The functions may be stored in a computer readable storage medium if implemented in the form of software functional units and sold or used as separate products. Based on the understanding, the technical solution of the present disclosure, in essence, or the part contributing to the prior art, or the part of the technical solution, may be embodied in the form of a software product stored in a storage medium, including several instructions for causing a computer device (which may be a personal computer, a server, or a network device, etc.) to perform all or part of the acts of the method described in various implementations of the present disclosure. The aforementioned storage medium include a U disk, mobile hard disk, read-only memory (ROM), random access memory (RAM), magnetic disk or optical disk and other media that can store program codes.

The foregoing is only specific implementations of the present disclosure, but the scope of protection of the present disclosure is not limited thereto. Any person skilled in the art can easily think of changes or substitutions within the technical scope disclosed by the present disclosure, which should be included within the scope of protection of the present disclosure. Therefore, the scope of protection of the present disclosure should be subject to the scope of protection of the claims.

What I claim is:

1. A method for transmitting data, comprising:
    determining, by a network device, a numerology for transmitting data and determining, by the network device, a target frequency band for transmitting the data, wherein the target frequency band comprises a transmission frequency band for transmitting the data and a guard tone; and
    receiving, by the network device, the data sent by a terminal device on the transmission frequency band according to the numerology, or sending, by the network device, the data to the terminal device on the transmission frequency band according to the numerology; wherein, the guard tone is a frequency band used for isolating frequency bands used for data transmissions based on different numerologies.

2. The method according to claim 1, wherein the information of the target frequency band comprises a start position and an end position of the target frequency band, a bandwidth of the guard tone, and a position of the guard tone in the target frequency band.

3. The method according to claim 1, wherein the information of the target frequency band comprises a start position and an end position of the target frequency band and a start position and an end position of the guard tone.

4. The method according to claim 2, wherein the position of the guard tone in the target frequency band comprises: a low-frequency end of the target frequency band where the guard tone is located, or a high-frequency end of the target frequency band where the guard tone is located, or a low-frequency end and a high-frequency end of the target frequency band where the guard tone is located.

5. The method according to claim 2, wherein the bandwidth of the guard tone is an integer multiple of minimum subcarrier spacing supported by the network device.

6. The method according to any one of claim 1, wherein the numerology comprises subcarrier spacing.

7. The method according to claim 1, wherein determining, by the network device, the numerology for transmitting the data comprises:
    determining, by the network device, the numerology for transmitting the data from a plurality of predefined numerologies.

* * * * *